(12) United States Patent
Sano

(10) Patent No.: US 9,740,063 B2
(45) Date of Patent: Aug. 22, 2017

(54) REFLECTIVE TYPE LIQUID CRYSTAL DISPLAY DEVICE

(71) Applicant: Japan Display Inc., Minato-ku (JP)

(72) Inventor: Takumi Sano, Minato-ku (JP)

(73) Assignee: Japan Display Inc., Minato-ku (JP)

(*) Notice: Subject to any disclaimer, the term of this patent is extended or adjusted under 35 U.S.C. 154(b) by 100 days.

(21) Appl. No.: 14/941,893

(22) Filed: Nov. 16, 2015

(65) Prior Publication Data

US 2016/0154284 A1   Jun. 2, 2016

(30) Foreign Application Priority Data

Nov. 28, 2014 (JP) ................................. 2014-241680
Jul. 16, 2015 (JP) ................................. 2015-141950

(51) Int. Cl.
*G02F 1/1335* (2006.01)
*G02F 1/1333* (2006.01)
*G02F 1/1343* (2006.01)
*G02F 1/1362* (2006.01)

(52) U.S. Cl.
CPC .. *G02F 1/134363* (2013.01); *G02F 1/133553* (2013.01); *G02F 2001/136218* (2013.01); *G02F 2001/136222* (2013.01)

(58) Field of Classification Search
CPC ......... G02F 1/133707; G02F 1/134363; G02F 1/1393; G02F 1/133514; G02F 1/133555; G02F 1/134309; G02F 1/133512; G02F 1/133345; G02F 1/13394; H01L 27/3258
See application file for complete search history.

(56) References Cited

U.S. PATENT DOCUMENTS

| | | | |
|---|---|---|---|
| 7,548,291 B2* | 6/2009 | Lee | G02F 1/133514 349/106 |
| 7,760,301 B2* | 7/2010 | Matsushima | G02F 1/1323 349/123 |
| 2009/0201449 A1* | 8/2009 | Nishida | G02F 1/134363 349/114 |
| 2009/0262286 A1* | 10/2009 | Nishida | G02F 1/133555 349/114 |

FOREIGN PATENT DOCUMENTS

JP    2002-55357    2/2002

* cited by examiner

*Primary Examiner* — Huyen Ngo
(74) *Attorney, Agent, or Firm* — Oblon, McClelland, Maier & Neustadt, L.L.P.

(57) ABSTRACT

According to one embodiment, a reflective type liquid crystal display device 11 that can be manufactured at low cost and that can improve a response speed and an aperture ratio is provided. A liquid crystal layer is a positive type liquid crystal layer including vertically-aligned liquid crystal molecules between an array substrate and a counter substrate. The array substrate includes a plurality of pixel electrodes, a plurality of common electrodes, a color filter, and a reflection layer. The color filter is disposed in a lower layer of the pixel electrodes and the common electrodes. The reflection layer is electrically connected to either the common electrodes or the pixel electrodes, and disposed at least in a lower layer of the color filter so as to reflect light having passed through the color filter.

6 Claims, 4 Drawing Sheets

REFLECTIVE TYPE LIQUID CRYSTAL DISPLAY DEVICE

INCORPORATOIN BY REFERENCE

The present invention claims priority under 35 U.S.C. §119 to Japanese Patent Application Nos. 2014-241680 and 2015-141950 filed on Nov. 28, 2014 and Jul. 16, 2015, respectively. The contents of these applications are incorporated herein by reference in their entirety.

FIELD

The embodiments of this invention relate to a reflective type liquid crystal display device which has a liquid crystal layer including vertically-aligned liquid crystal molecules between a first substrate and a second substrate.

BACKGROUND

Conventionally, a TN type (twisted nematic type) reflective type liquid crystal display device, for example, is used as a reflective type liquid crystal display device. In recent years, liquid crystal display devices are achieving higher definition. However, a TN type liquid crystal display device has some problems regarding, for example, slowness in response speed, lower display quality due to electrostatic destruction of a thin film transistor or the like caused by a rubbing treatment process to an alignment film, or the occurrence of so-called edge reverse (disclination) in which liquid crystal molecules existing between pixel electrodes having different polarities are reversed in the case of using a driving method such as a column inversion driving method or the like.

To solve such a problem, with a configuration applying a liquid crystal layer including liquid crystal molecules vertically aligned by use of an alignment film, the liquid crystal molecules are made to fall down in a transverse electric field mode, for example, IPS mode or the like. This is considered to improve response speed and display quality because rubbing treatment to the alignment film is omitted and thus the occurrence of electrostatic destruction is prevented. Further, a configuration of a liquid crystal display device that can provide a higher aperture ratio is desired.

DETAILED DESCRIPTION

A reflective type liquid crystal display device of each of the embodiments includes a first substrate, a second substrate, and a liquid crystal layer. The second substrate is disposed so as to face the first substrate. The liquid crystal layer is a positive type liquid crystal layer including vertically-aligned liquid crystal molecules between the first substrate and the second substrate. The first substrate includes a plurality of pixel electrodes, a plurality of common electrodes, a color filter, and a reflection layer. Each of the common electrodes forms a transverse electric field which makes liquid crystal molecules align between the common electrodes and each of the pixel electrodes. The color filter is disposed in a lower layer of the pixel electrodes and the common electrodes. The reflection layer is electrically connected to either the common electrodes or the pixel electrodes and is disposed in a lower layer of the color filter to reflect the light passing through the color filter.

The configuration of the first embodiment will be described with reference to FIG. 1A, FIG. 1B and FIG. 2.

Figure 1A:
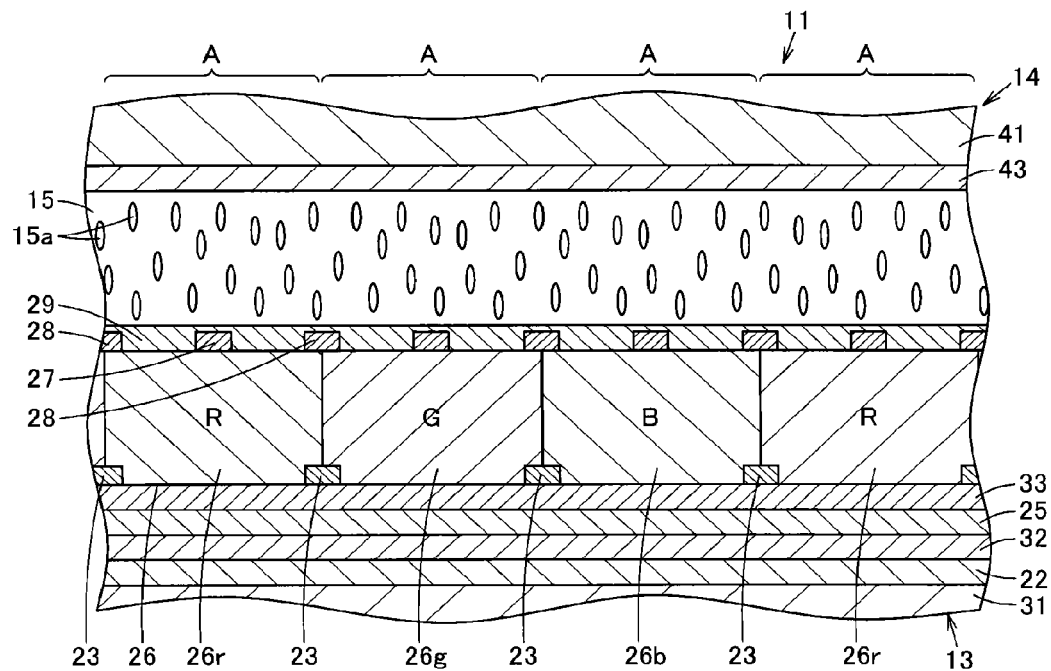
FIG. 1A is a sectional view schematically illustrating a part of an off-state of a switching element of a reflective type liquid crystal display device of a first embodiment in an enlarged manner.
Figure 1B:
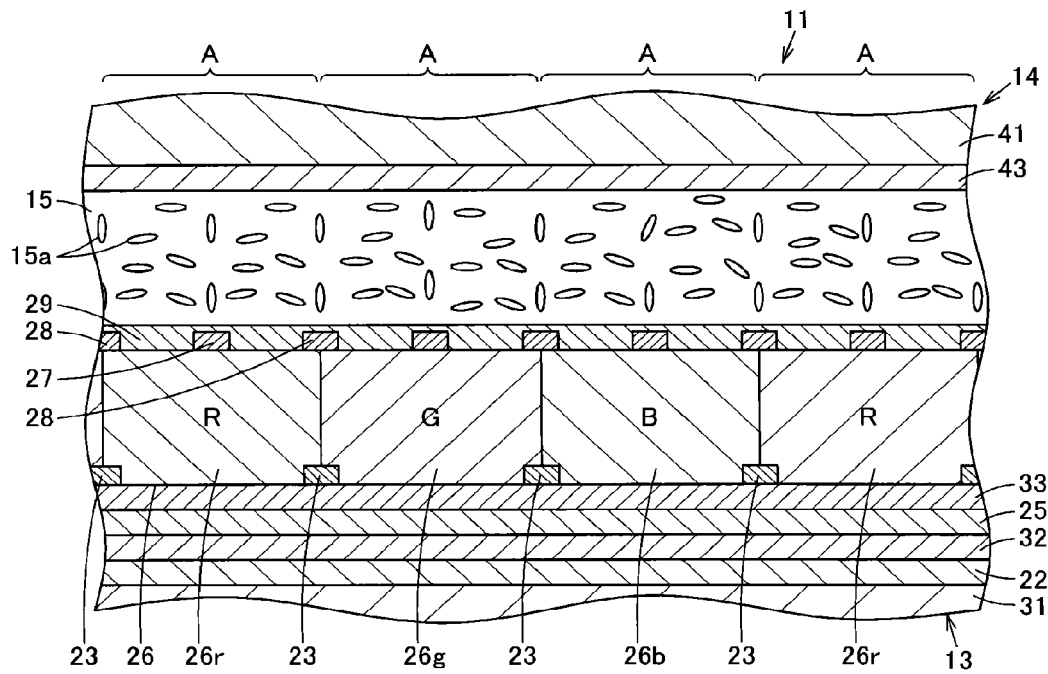
FIG. 1B is a sectional view schematically illustrating a part of an on-state of a switching element of the same reflective type liquid crystal display device in an enlarged manner.
Figure 2:
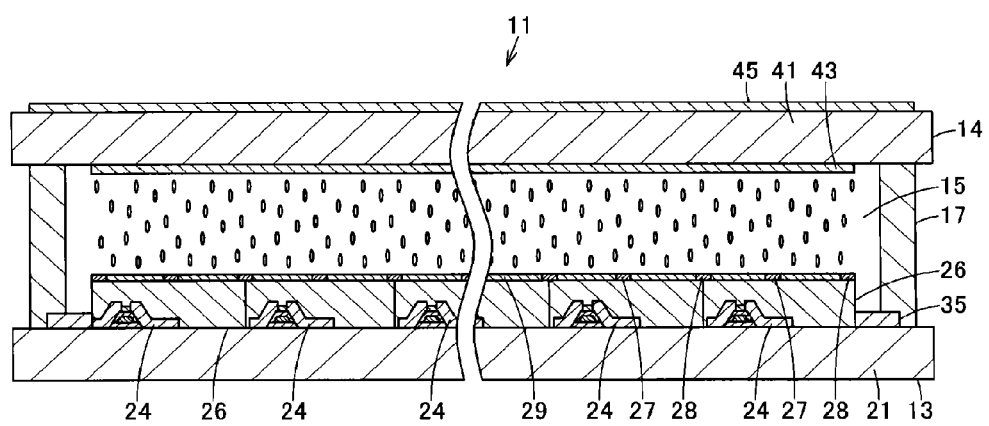
FIG. 2 is a sectional view illustrating the same reflective type liquid crystal display device.

In FIG. 1A, FIG. 1B and FIG. 2, reference numeral 11 indicates an active matrix type reflective type liquid crystal display device as a reflective type display device. As an outline, the reflective type liquid crystal display device 11 includes an array substrate 13 corresponding to a first substrate as a non-display side substrate, a counter substrate 14 corresponding to a second substrate as a display side substrate, and a liquid crystal layer 15 corresponding to an light modulating layer interposed between the substrates 13 and 14. In the reflective type liquid crystal display device 11, a gap holding member (spacer) not shown in the drawings for holding a gap is interposed between the substrate 13 and the substrate 14. Further, a sealing member 17 made of an ultraviolet-curable resin or a thermosetting resin or the like, for example, is provided around the liquid crystal layer 15 to seal the liquid crystal layer 15. In the description below, the reflective type liquid crystal display device 11 may be simply abbreviated to display device 11. Further, the aspect ratio in each of FIG. 1A, FIG. 1B and FIG. 2 is changed in order to provide clearer description schematically.

The array substrate 13 includes a glass substrate 21 corresponding to a non-display side substrate body (first substrate body) having light transmitting properties and insulating properties, and further includes on the glass substrate 21, a plurality of scanning lines (gate lines) 22, a plurality of signal lines (source lines) 23, a plurality of thin film transistors 24 corresponding to switching elements, a reflection layer 25, a color filter (CF) 26, a plurality of pixel electrodes 27, a plurality of common electrodes 28, and an (first) alignment film 29. That is, the display 11 has a COA (Color filter On Array) structure.

More specifically, for example, an undercoat layer for flattening not shown in the drawings is provided on the array substrate 13, a semiconductor layer not shown in the drawings such as for the thin film transistors 24 is provided on the undercoat layer, an insulation layer 31 covering the semiconductor layer is provided, and the scanning lines 22 (gate electrodes of the thin film transistors 24) are provided on the insulation layer 31. A gate insulation film 32 is provided on the scanning lines 22, the reflection layer 25 (having the same potential as that of the common electrodes 28) electrically connected to the common electrodes 28 is provided on the gate insulation film 32, an interlayer insulation film 33 is provided on the reflection layer 25, and the signal lines 23 (source electrodes and drain electrodes of the thin film transistors 24) are provided on the interlayer insulation film 33. Further, the color filter 26 is provided on the interlayer insulation film 33 having the signal lines 23, the pixel electrodes 27 and the common electrodes 28 are provided on the color filter 26, and the alignment film 29 is provided on the color filter 26 having the pixel electrodes 27 and the common electrodes 28. The array substrate 13 may be any substrate having light transmitting properties and insulating properties, such as a synthetic-resin substrate or the like, instead of the glass substrate 21.

Each of the scanning lines 22 is disposed along a horizontal (H) direction and is electrically connected to a driver, not shown in the drawings, provided on the glass substrate 21 or the like, for example.

Each of the signal lines 23, in a state of being insulated from the scanning lines 22, is disposed along a vertical (V) direction crossing (orthogonal to) the scanning lines 22 and is electrically connected to a driver, not shown in the drawings, provided on the glass substrate 21 or the like, for example. Each of the signal lines 23 is electrically connected to an external circuit not shown in the drawings. In this embodiment, each of the signal lines 23 is, for example, set to approx. 0.35 μm thick.

The thin film transistors 24 are each disposed at locations where the scanning lines 22 cross the signal lines 23. Therefore, the thin film transistors 24 are disposed in a matrix. The thin film transistors 24 are disposed so that the gate electrodes face a channel region of the semiconductor layer via the gate insulation film 32, and the source electrodes and the drain electrodes are electrically connected to a source region and a drain region of the semiconductor layer, respectively. Further, the gate electrodes of the thin film transistors 24 are electrically connected to the scanning lines 22, the source electrodes thereof are electrically connected to the signal lines 23, and the drain electrodes thereof are electrically connected to the pixel electrodes 27.

The reflection layer 25 is a reflection pixel that reflects extraneous light and is made of, for example, aluminum, silver, or a compound or alloy or the like containing aluminum or silver as one component, and is set to a prescribed thickness. The reflection layer 25 is disposed in a layer located above the scanning lines 22 (gate electrodes) and a layer under the color filter 26 so as to face the scanning lines 22 and the entire surface of the color filter 26, and is electrically connected to the pixel electrodes 27 or the common electrodes 28, thereby shielding an unwanted leakage electric field that is directed from the scanning lines 22 to the liquid crystal layer 15. In this embodiment, the reflection layer 25 is, for example, set to approx. 0.13 μm thick.

The color filter 26 is disposed in a lower layer of the pixel electrodes 27 and the common electrodes 28 and has, for example, filter parts 26r, 26g and 26b respectively corresponding to red (R), green (G) and blue (B), and a light shielding part (black matrix) not shown in the drawings, which partitions the filter parts 26r, 26g and 26b into blocks to shield unwanted light. Each of the filter parts 26r, 26g and 26b is provided to correspond to each of the pixel electrodes 27. In this embodiment, each of the filter parts 26r, 26g and 26b is disposed in pixel regions A that are each disposed in a matrix and surrounded by the scanning lines 22 and the signal lines 23. Moreover, the color filter 26 is surrounded by a black light shielding part 35. In this embodiment, the color filter 26 (filter parts 26r, 26g and 26b) is, for example, set to approx. 2.0 μm thick.

Each of the pixel electrodes 27 is made of a transparent conductive member, for example ITO or IZO or the like, and is formed into an elongated shape along the direction of the signal lines 23, and disposed at each of the pixel regions A.

Each of the common electrodes 28 is made of a transparent conductive member, for example ITO or IZO or the like, and formed into an elongated shape in the direction of the signal lines 23 along a boundary between adjacent pixel regions A, A. Further, the common electrodes 28 are each disposed at a position directly above the signal lines 23. That is, the common electrodes 28 are disposed separated from the pixel electrodes 27, while respectively corresponding to each of the pixel electrodes 27, wherein the pixel electrodes 27 and the common electrodes 28 are alternately disposed along the direction of the scanning lines 22. Further, the common electrodes 28 are formed to have substantially the same width as the pixel electrodes 27, and a space between the pixel electrodes 27 and the common electrodes 28 is set two times wider or more than the width of the pixel electrodes 27 and the common electrodes 28. In this embodiment, for example, the pixel electrodes 27 and the common electrodes 28 are set to approx. 2.5 μm wide and approx. 0.07 μm thick, respectively, and are disposed separated from one another with a 15.0 μm or more space therebetween.

The transverse electric field formed between two common electrodes 28, 28 having a pixel region A sandwiched therebetween and one pixel electrode 27 located between the two common electrodes 28, 28 in the pixel region A provides switching (FIG. 1A and FIG. 1B) of the liquid crystal molecules (director) 15a in the liquid crystal layer 15.

The alignment film 29 is made of synthetic resin, for example, polyimide or the like. In this embodiment, the alignment film 29 is, for example, set to approx. 0.07 μm thick.

The insulation layer 31 is, for example, a silicon oxide film or a silicon nitride film or the like.

The gate insulation film 32 is, for example, a silicon nitride film or the like.

The interlayer insulation film 33 is, for example, a silicon oxide film or the like. In this embodiment, the interlayer insulation film 33 is, for example, set to approx. 0.18 μm thick.

Further, the counter substrate 14 includes a glass substrate 41 corresponding to a display side substrate body (second substrate body) having light transmitting properties and insulating properties, and further includes on the glass substrate 41 a rib-like structure not shown in the drawings, and an (second) alignment film 43 contacting the liquid crystal layer 15 while covering the structure. The rib-like structure controls as a control unit the falling direction of the liquid crystal molecules 15a when a voltage is applied. That is, the counter substrate 14 has no electrode formed thereon, and the liquid crystal layer 15 is divided by the structure into a plurality of domains at portions respectively corresponding to the pixel regions A. Further, a polarizing plate 45 is mounted on the opposite side of the liquid crystal layer 15 of the glass substrate 41, that is, on the display side. The counter substrate 14 may be any substrate as long as it has light transmitting properties and insulating properties, such as a synthetic-resin substrate, for example, instead of the glass substrate.

The alignment film 43 is made of synthetic resin, for example, polyimide or the like, and the rib-like structure forms the liquid crystal molecules 15a in the liquid crystal layer 15 into a substantially vertical line between the alignment film 43 and the alignment film 29 on the side of the array substrate 13. In this embodiment, the alignment film 43 is, for example, approx. set to 0.07 μm thick, substantially the same as the alignment film 29.

In the liquid crystal layer 15, the liquid crystal molecules 15a are vertically aligned between the alignment films 29 and 43. Thus, a positive type liquid crystal layer having a positive dielectric anisotropy is applied in order to make the liquid crystal molecules 15a fall in the transverse electric field between the pixel electrodes 27 and the common electrodes 28. In this embodiment, the liquid crystal layer 15 is, for example, set to approx. 2.8 μm thick.

In the above-described display device 11, each of the thin film transistors 24 individually drives each of the pixel electrodes 27 in accordance with a signal from each of the scanning lines 22, and the transverse electric field set between the above pixel electrode 27 and the two common electrodes 28, 28 having the above pixel electrode 27 sandwiched therebetween makes the liquid crystal molecules 15a in the liquid crystal layer 15 fall down in accordance with a signal from each of the signal lines 23. The polarity of the above pixel electrode 27 can be selected with the signal lines 23 located in a lower layer of the two common electrodes 28, 28, and an appropriate driving method can be used, for example, column inversion driving in which the polarity is inverted every predetermined number of signal lines 23 for each of the scanning lines 22. In this state, extraneous light made incident from the side of the counter substrate 14 passes through the filter parts 26r, 26g and 26b of the color filter 26 via the liquid crystal layer 15, and then is reflected by the reflection layer 25 located in a lower layer of the color filter 26. This sets the transmittance of the reflected light at each of the pixel electrodes 27 in accordance with the angles of the liquid crystal molecules 15a in the liquid crystal layer 15, and the reflected light having passed through the color filter 26 again and having been emitted to the side of the counter substrate 14 is displayed as an image.

According to the first embodiment described above, the use of the positive type liquid crystal layer 15 including vertically-aligned liquid crystal molecules 15a enables cheap manufacturing, can improve edge reverse likely to occur between pixel electrodes having different polarities in the case of implementing column inversion driving or the like using, for example, a TN type liquid crystal layer, and allows the use of a circular polarizing plate as the polarizing plate 45, thus realizing the reflective type liquid crystal display device 11 having a high transmittance in normally black displaying. Further, as a normal liquid crystal layer used in a vertical alignment (VA) mode, a negative-type liquid crystal layer is used so as to make liquid crystal molecules fall in a vertical electric field. In this embodiment, however, the plurality of pixel electrodes 27 and the common electrodes 28 corresponding to the plurality of pixel electrodes 27 are formed on the array substrate 13, and the transverse electric field is formed by a transverse electric field method to make the liquid crystal molecules 15a aligned between the pixel electrodes 27 and the common electrodes 28. The use of the positive type liquid crystal layer 15 having a higher response speed than that of the negative-type liquid crystal layer can improve the response speed thereof. Further, the provision of the color filter 26 on the array substrate 13 makes it easier to adjust positioning of the array substrate 13 and the counter substrate 14 compared to an example case where the color filter is provided on the counter substrate side. This can suppress reduction of an aperture ratio caused by displacement or the like between the array substrate 13 and the counter substrate 14, thus realizing a high aperture ratio. In addition, the disposement of the reflection layer 25 in a layer lower of the entire color filter 26 and upper layer of the scanning lines 22, that is, between the color filter 26 (liquid crystal layer 15) and the scanning lines 22 allows the reflection layer 25 to shield the unwanted leakage electric field directed from the scanning lines 22 to the liquid crystal layer 15, thus enabling the suppression of a reduction of display quality caused by the leakage electric field.

Further, the counter substrate 14 does not require any counter electrodes, thus making it easier to adjust positioning of the array substrate 13 and the counter substrate 14.

Moreover, the vertically-aligned liquid crystal molecules 15a do not require rubbing alignment treatment to the alignment films 29 and 43. This can prevent electrostatic destruction from occurring due to rubbing and improve yield, thus further reducing cost when manufacturing the display device 11.

The widths of the pixel electrodes 27 and the common electrodes 28 are substantially the same as each other, and the space between the pixel electrodes 27 and the common electrodes 28 is set two times wider or more than the width of the pixel electrodes 27 or the common electrodes 28. This suppresses obstruction of light (incident light and reflection light) by the pixel electrodes 27 and the common electrodes 28, and also reduces the number of not-falling liquid crystal molecules 15a located directly above the pixel electrodes 27 and the common electrodes 28 by the transverse electric field, thus achieving low driving voltage, for example, less than 5 V, while providing high transmittance.

Figure 3A:
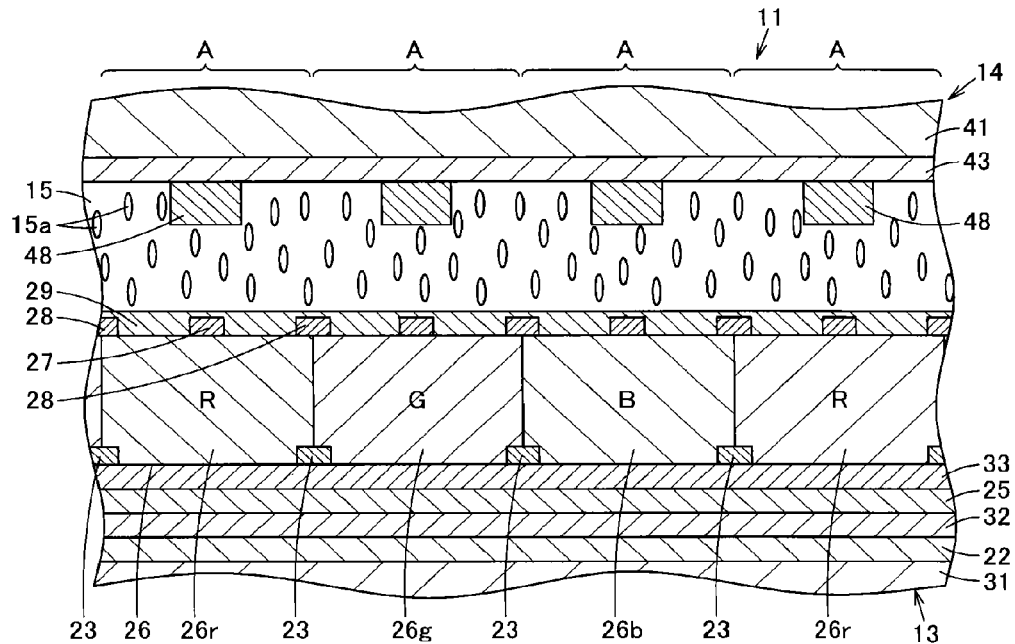
FIG. 3A is a sectional view schematically illustrating a part of an off-state of a switching element of a reflective type liquid crystal display device of a second embodiment in an enlarged manner.
Figure 3B:
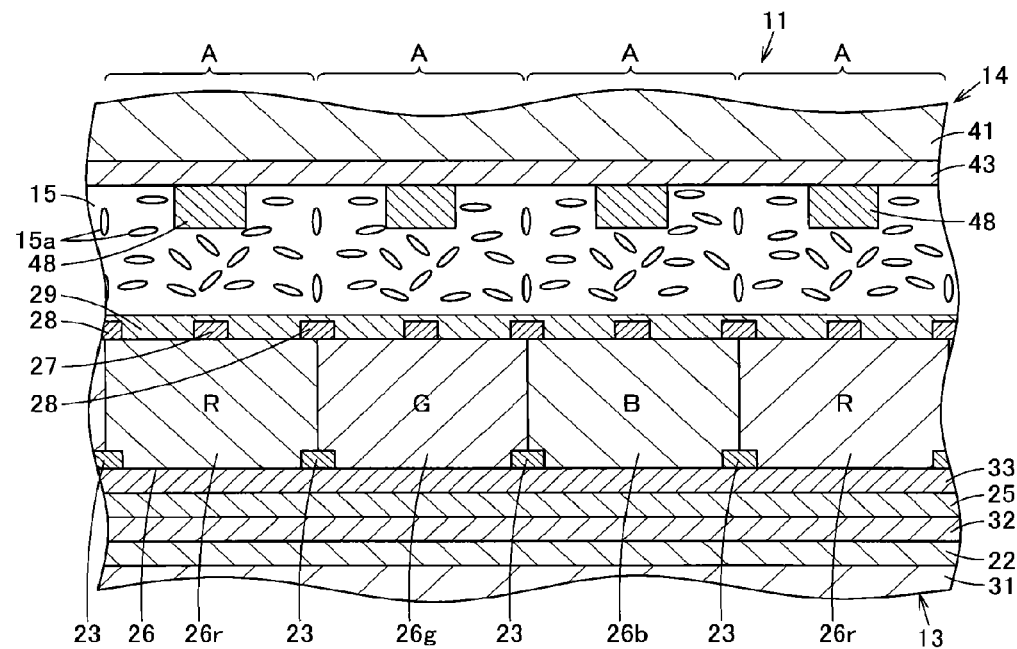
FIG. 3B is a sectional view schematically illustrating a part of an on-state of a switching element of the reflective type liquid crystal display device of the second embodiment.
Figure 4:
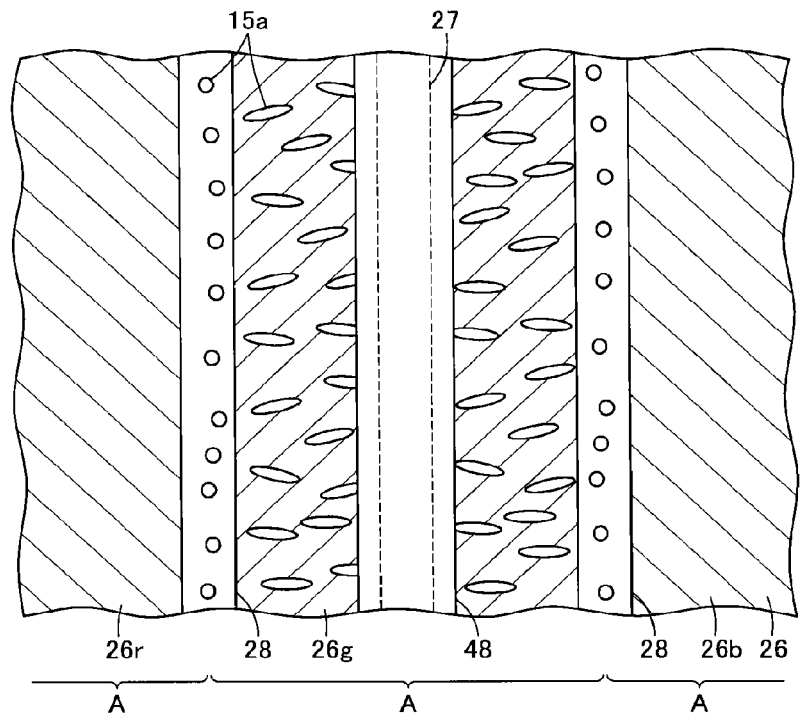
FIG. 4 is a plan view schematically illustrating a part of the reflective type liquid crystal display device of the second embodiment.

Next, a second embodiment will be described with reference to FIG. 3A, FIG. 3B and FIG. 4. Configurations and effects of the second embodiment that are the same as those of the first embodiment are identified by the same signs and the description thereof will be omitted.

In the second embodiment, ribs 48 are respectively disposed at positions facing each of the pixel electrodes 27 on the counter substrate 14 of the aforementioned first embodiment.

Each of the ribs 48 is formed of a member having a high transmittance and a low dielectric constant. That is, each of the ribs 48 has light transmitting properties. Each of the ribs 48 is formed along the center position of each of the pixel regions A and along each of the pixel electrodes 27. Therefore, in this embodiment, each of the ribs 48 is formed in a linear shape. Each of the ribs 48 has a lower dielectric constant than the liquid crystal layer 15; for example, a dielectric constant set to approx. one seventh, preferably 0.1 to 0.2 times the dielectric constant of the liquid crystal layer 15. Each of the ribs 48 has a square shape in cross section, and is set thicker (in height) and wider than each of the pixel electrodes 27. Each of the ribs 48 is, for example, set to 0.7±0.1 μm thick and, for example, 6.0±0.25 μm wide. Preferably, each of the ribs 48 is 0.3 to 0.4 times wider than the color filter 26, and is 0.3 to 0.4 times thicker (in height) than the liquid crystal layer 15.

As described above, each of the ribs 48 having a high transmittance and a low dielectric constant is provided at a position facing each of the pixel electrodes 27 on the counter substrate 14. Thus, when a voltage is applied to the pixel electrodes 27, the ribs 48 disturb electric field vectors between the pixel electrodes 27 and the common electrodes 28, thereby being able to make the liquid crystal molecules 15a located above (directly above) the pixel electrodes 27 fall. Therefore, reflectance can be improved.

The ribs 48 that are set thicker and wider than the pixel electrodes 27 allow the liquid crystal molecules 15a to be made to fall down more certainly when a voltage is applied to the pixel electrodes 27.

Figure 5:
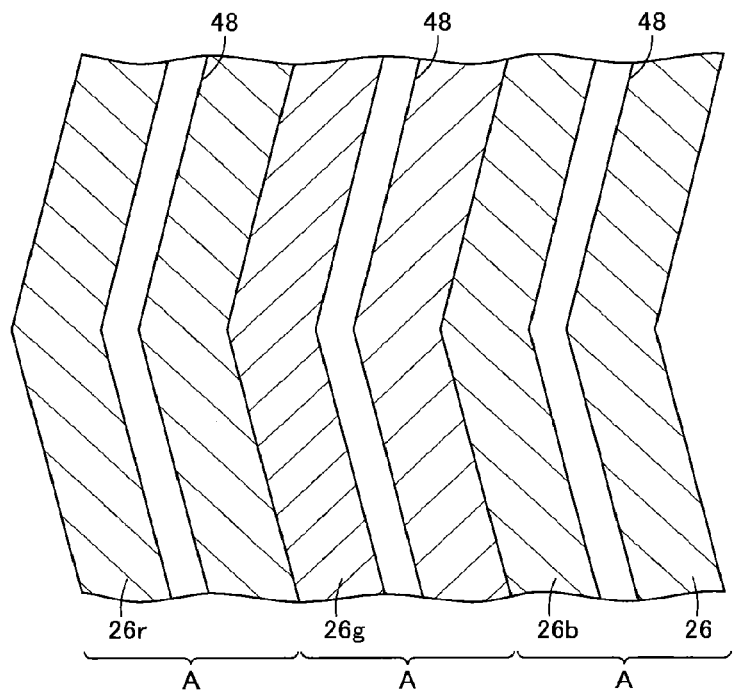
FIG. 5 is a plan view schematically illustrating a part of a reflective type liquid crystal display device of a third embodiment.

In the second embodiment described above, in the case of using multi-domain pixel regions A for improving a viewing angle or other purposes, each of the pixel regions A may have a bent shape, not necessarily having a rectangle shape. In this case, as shown in the third embodiment of FIG. 5 for example, each of the ribs 48 is formed in a bent shape along the center position of each of the pixel regions A, thereby providing the same effect as the aforementioned second embodiment.

In each of the embodiments above, any arrangement and colors of the filter parts 26r, 26g and 26b of the color filter 26 can be set as long as they realize color displaying on the display device 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A reflective type liquid crystal display device comprising:
    a first substrate;
    a second substrate that is disposed at a position facing the first substrate; and
    a positive type liquid crystal layer that includes vertically-aligned liquid crystal molecules between the first substrate and the second substrate, wherein
    the first substrate includes
        a plurality of pixel electrodes,
        a plurality of common electrodes each of which forms a transverse electric field to align the liquid crystal molecules between each of the plurality of pixel electrodes and each of the plurality of common electrodes,
        a color filter that is disposed in a lower layer of the pixel electrodes and the common electrodes, and
        a reflection layer that is electrically connected to either the common electrodes or the pixel electrodes, and that is disposed in a lower layer of the color filter so as to reflect light having passed through the color filter.

2. The reflective type liquid crystal display device according to claim 1, wherein
    each of the pixel electrodes and the common electrodes respectively has a prescribed width, and a space between each of the pixel electrodes and each of the common electrodes is set to two times wider or more than the width.

3. The reflective type liquid crystal display device according to claim 1, wherein
    the second substrate includes, at positions facing the pixel electrodes, ribs having light transmitting properties and having a lower dielectric constant than a dielectric constant of the liquid crystal layer.

4. The reflective type liquid crystal display device according to claim 3, wherein
    each of the ribs is set wider and thicker than each of the pixel electrodes.

5. The reflective type liquid crystal display device according to claim 4, wherein
    each of the ribs is 0.3 to 0.4 times wider than the color filter, and 0.3 to 0.4 times thicker than the liquid crystal layer.

6. The reflective type liquid crystal display device according to claim 4, wherein
    the dielectric constant of the ribs is 0.1 to 0.2 times of the dielectric constant of the liquid crystal layer.

* * * * *